(12) United States Patent
Lester

(10) Patent No.: US 9,874,913 B2
(45) Date of Patent: Jan. 23, 2018

(54) APPARATUS AND METHODS FOR POWER CONFLICT RESOLUTION IN POWER DELIVERY SYSTEMS

(71) Applicant: Intel Corporation, Santa Clara, CA (US)

(72) Inventor: Scot Lester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 14/580,285

(22) Filed: Dec. 23, 2014

(65) Prior Publication Data

US 2016/0179155 A1 Jun. 23, 2016

(51) Int. Cl.
  *G06F 1/26* (2006.01)
(52) U.S. Cl.
  CPC ............. *G06F 1/263* (2013.01); *G06F 1/266* (2013.01)
(58) Field of Classification Search
  CPC ........................................................ G06F 1/263
  See application file for complete search history.

(56) References Cited

U.S. PATENT DOCUMENTS

| 6,625,996 | B2 * | 9/2003 | Nakajima | ............. | F24F 11/006 |
| | | | | | 236/51 |
| 8,656,193 | B2 | 2/2014 | Hijazi et al. | | |
| 8,772,966 | B1 | 7/2014 | Agrawal et al. | | |
| 9,256,263 | B1 * | 2/2016 | Narayanan | ................. | G06F 1/30 |
| 2008/0114998 | A1 * | 5/2008 | Ferentz | .................. | H04L 12/12 |
| | | | | | 713/324 |
| 2010/0115296 | A1 * | 5/2010 | Inoue | ..................... | G06F 1/266 |
| | | | | | 713/300 |
| 2011/0095615 | A1 | 4/2011 | Li et al. | | |
| 2012/0246458 | A1 * | 9/2012 | Jain | ........................ | G06F 1/3253 |
| | | | | | 713/100 |
| 2013/0238920 | A1 * | 9/2013 | Harris | ..................... | G06F 1/325 |
| | | | | | 713/323 |
| 2014/0203639 | A1 | 7/2014 | Rozman et al. | | |
| 2014/0327475 | A1 | 11/2014 | Groot et al. | | |
| 2015/0198989 | A1 * | 7/2015 | Hayter | .................... | G06F 1/266 |
| | | | | | 713/340 |
| 2015/0323979 | A1 * | 11/2015 | Kaestner | ................. | G06F 1/266 |
| | | | | | 713/323 |
| 2016/0011650 | A1 * | 1/2016 | Yang | ..................... | G06F 1/3206 |
| | | | | | 713/323 |
| 2016/0064938 | A1 * | 3/2016 | Balasubramanian | ... | H04L 12/10 |
| | | | | | 307/11 |

OTHER PUBLICATIONS

International Searching Authority, "Notification of Transmittal of the International Search Report and the Written Opinion of the International Searching Authority," dated Mar. 4, 2016 in International application No. PCT/US2015/062279.

* cited by examiner

*Primary Examiner* — Thomas Lee
*Assistant Examiner* — Mohammad A Rahman
(74) *Attorney, Agent, or Firm* — Trop, Pruner & Hu, P.C.

(57) ABSTRACT

An apparatus includes voltage summation logic to provide a summed voltage corresponding to a sum of voltage contributions, each contribution associated with a corresponding port controller of a plurality of port controllers. The apparatus also includes a first port controller to determine, based on the summed voltage, whether a second power source is to be coupled to a system power bus of a system via a second port controller of the plurality of port controllers, and if not, the first port controller is to couple a first power source to the system power bus. Other embodiments are described and claimed.

19 Claims, 4 Drawing Sheets

APPARATUS AND METHODS FOR POWER CONFLICT RESOLUTION IN POWER DELIVERY SYSTEMS

TECHNICAL FIELD

Embodiments pertain to power delivery systems.

BACKGROUND

Universal serial bus power delivery (USB-PD) can enable a universal serial bus (USB) device, e.g., a system such as a portable computing device, to receive power from a power source. A system with multiple USB-PD enabled ports may permit more than one power source to be connected to the system at the same time. If different input power sources are connected to two distinct USB ports at the same time, the input power sources may cause damage to the USB device and/or to one another.

DETAILED DESCRIPTION

A microcontroller (EC) that is powered by an internal battery of the system may be used to determine how much power is available from a power source and whether the power source is connected to the system. The EC may require that portions of the system be powered up to complete the connection, which can consume both power and time. Further, if the system has a dead battery, the EC is not being powered, and consequently several power sources may be connected to the system power bus concurrently that can result in damage to the system and/or to the power sources.

In embodiments, a USB-PD port controller integrated circuit (port controller herein) may be used to control connecting a system power bus to an input power source via a USB-PD connector (e.g., USB type C connector or another USB connector) of a USB device. The port controller may negotiate with the input power source, and after negotiation may connect the input power source to the system power bus of the USB device.

Multiple input power sources may be available to connect to a system power bus of the USB device, with each input power source connected to a corresponding USB port. The USB device may include a plurality of port controllers, each port controller to control whether a corresponding input power source that provides power to the corresponding USB port is to be connected to the system power bus. In embodiments, each port controller includes dedicated pin that can be used to determine whether the port controller can safely connect the corresponding input power source to the system power bus, or whether another port controller has already connected, or intends to connect or is in the process of connecting, another power source to the system power bus. Thus, coupling of more than one input power source to the system power bus may be avoided.

In embodiments, each port controller may automatically connect power received via one USB port to a system power bus without involvement of other microcontrollers, voltage regulators and software/firmware, and can result in savings of cost, space and power. Embodiments may make use of a current summing node, and so any number of USB-PD ports can be added to the system without need for additional hardware or software. Apparatuses and methods presented herein may scale to larger systems more easily than, e.g., hard coded systems for power source negotiation and connection.

Embodiments may include a dedicated pin of the USB-PD port controller that can be used to determine if any other port controller has connected power to the system power bus. If no other port controller has connected power to the system power bus, the port controller can connect the system power bus to the input power source input via the USB port with which the port controller is associated.

Figure 1:
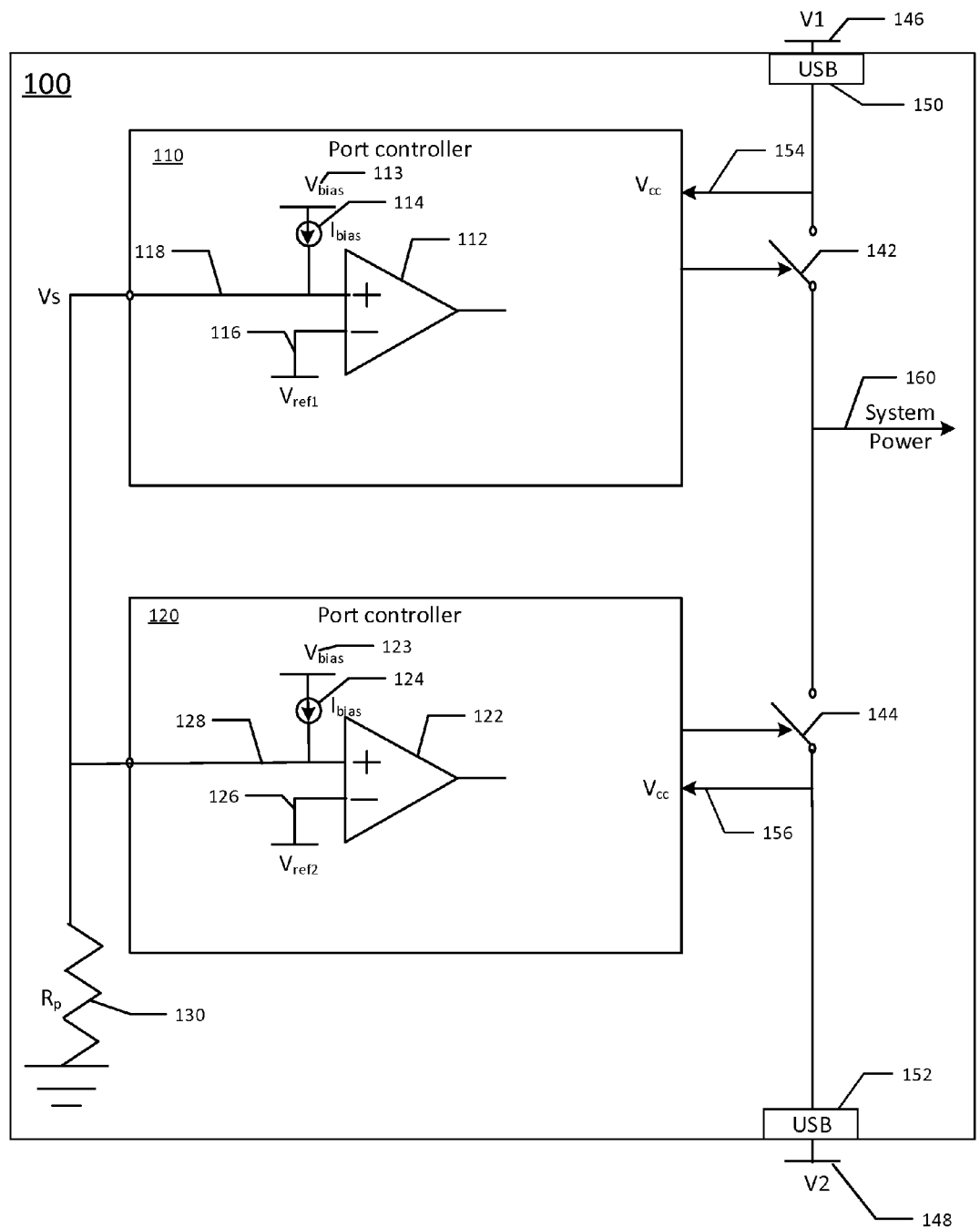
FIG. 1 is a block diagram of a system, according to an embodiment of the present invention.

FIG. 1 is a block diagram of a system, according to an embodiment of the present invention. System 100 may be, e.g., a device such as a portable computing device, portable phone, etc., and includes port controllers 110 and 120, a summing resistor 130, USB ports 150 and 152, and switches 142 and 144. Port controller 110 may be powered by a first power source 146, through a $V_{cc}$ power line 154. Port controller 120 may be powered by a second power source 148, through a $V_{cc}$ power line 156. Port controller 110 includes comparator logic 112, a bias voltage source 113, a bias current source 114, a reference voltage source $V_{ref1}$ 116, and a communication pin 118. Controller 120 includes comparator logic 122, a bias voltage source 123, a current source 124, a reference voltage source $V_{ref\,2}$ 126, and a communication pin 128. In embodiments, the comparator logic 112, 122 may include software, hardware, firmware, or a combination thereof. For example, the comparator logic 112, 122 may include operational amplifier circuitry, comparator circuitry, emulation software, firmware, or a combination of operational amplifier circuitry, software, firmware, etc.

Communication pins 118, 128 may communicate a status of the corresponding port controller, e.g., whether system power is being provided by a voltage source controlled by the corresponding port controller, to other port controllers. Communication pin 118 may receive bias current $I_{bias}$ from the bias current source 114 when the port controller 110 intends to connect or has connected, input power source 146 to a system power bus (also system power rail herein) 150 via a switch 142. The bias current $I_{bias}$ may correspond to the internal bias voltage 113. Communication pin 128 may receive a bias current from a bias current source 124 that is to indicate an intent of the port controller 120 to couple input power source 148 to the system power bus 150 via switch 144. The bias current from the bias current source 124 may correspond to the internal bias voltage 123.

The communication pins 118, 128 are both coupled to one side of a summing resistor 130, of which the other side is coupled to ground. The summing resistor 130 receives the bias currents, resulting in a summed voltage across terminals of the summing resistor 130 due to the combination of bias currents received. In an embodiment in which each bias current produced by a corresponding port controller has the same value, the summed voltage $V_s$ at each communication pin 118, 128 is given by $V_s = N * I_{bias} * R_p$, where N is the number of port controllers that are supplying $I_{bias}$ to their respective pins. For a two port example shown in FIG. 1, N can equal 0, 1, or 2. (It is to be noted that in other embodiments, each bias current $(I_{bias})_i$ provided by a corresponding port controller may have a distinct value, and $Vs = \Sigma(I_{bias})_i * R_p)$.

Each port controller 110, 120, may monitor the voltage $V_s$ via the corresponding communication pin 118, 128. If the voltage $V_s$ is zero, the port controller 110 may decide to couple the power source 146 to the system power rail, and the port controller may source $I_{bias}$. The port controller 110 can then check the voltage $V_s$ on the communication pin 118. A voltage $Vs = I_{bias} * R_p$ (which may be determined by, e.g., comparison of Vs to a reference voltage $V_{ref\,1}$) indicates that no other port controllers have connected or are in process of connecting a corresponding power source to the system power bus. Therefore, the port controller 110 may connect its power source 146 received via USB connector 150 (e.g., USB Type C connector), through switch 142, to the system power bus 160.

A voltage of $V_s = 2 * I_{bias} * R_p$ may be interpreted as two port controllers that intend to connect or are in the process of connecting, their respective power sources to the system power bus, e.g., concurrently. Therefore, each port controller 110 and 120 will refrain from coupling its respective power source 146, 148 to the system power bus 160. In one embodiment, the port controller 110 may check $V_s$ after a time delay and if $V_s = 0$, may retry to couple its power source to the system power bus. For example, if the port controller 110 detects that it is safe to connect the power source to the system power bus, e.g., $V_s = 0$, it may can re-activate the bias current source 114 to output $I_{bias}$ to indicate that the port controller 110 intends to couple the power source 146 to the system power bus 160, and if $V_s = I_{bias} * R_p$ the port controller 110 may actuate the switch 142 to connect the input source 146 to the system power bus 160. Similarly, port controller 120 may monitor $V_s$ to determine whether it is safe to connect power source 148 to the system power bus 150. If $V_s = 0$, port controller 120 may re-activate bias current source 124 to indicate that the port controller 120 intends to couple the power source 148 to the system power bus 160, and if $V_s = I_{bias} * R_p$ the port controller 120 may activate switch 144 to couple the power source 148 to the system power bus 160.

Figure 2:
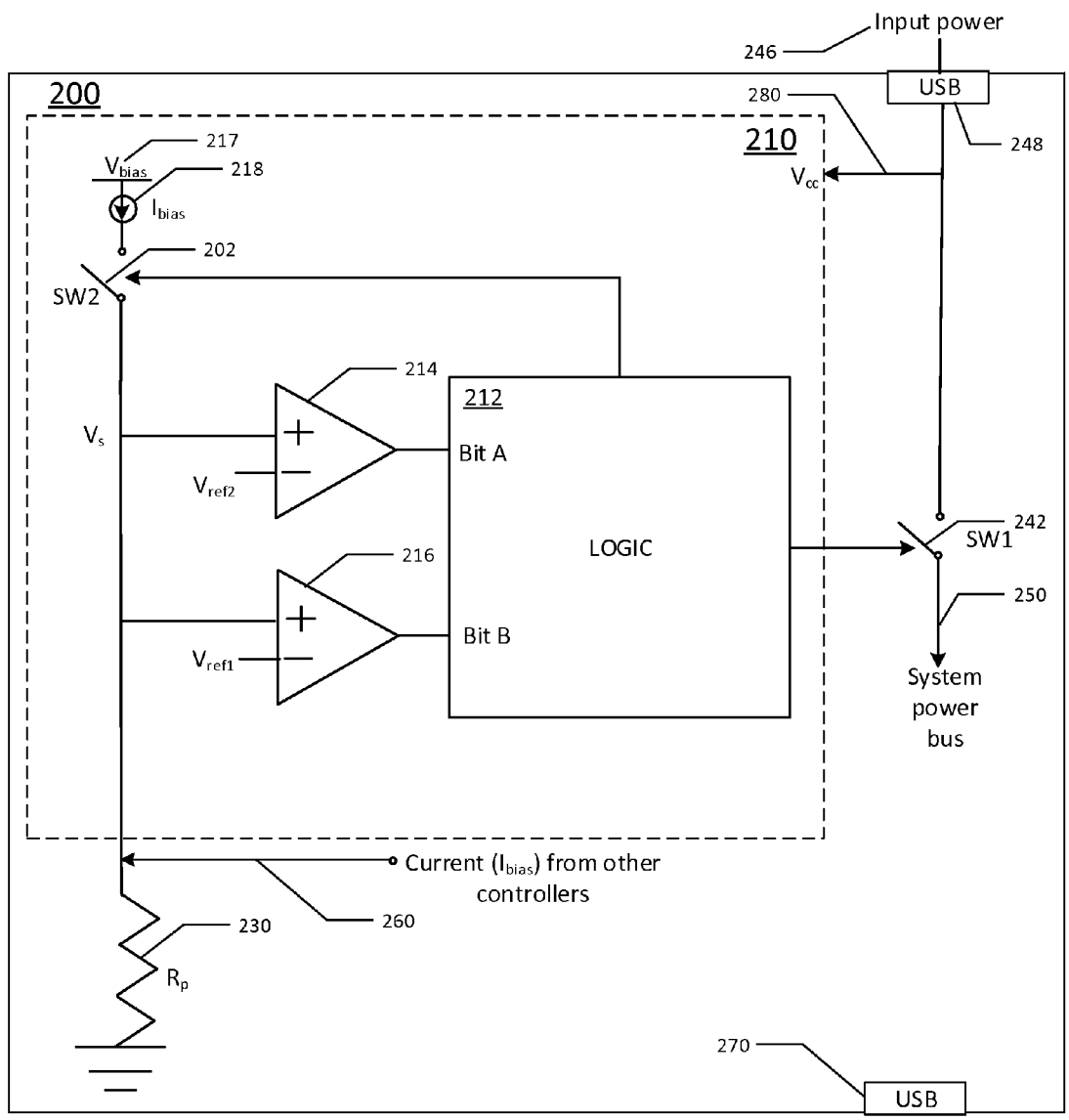
FIG. 2 is a block diagram of a system, according to another embodiment of the present invention.

FIG. 2 is a block diagram of a system, according to another embodiment of the present invention. The system 200 may be a portable device and includes USB ports 248 and 270, a port controller 210, a summing resistor $R_p$ 230, and a switch 242, and may include other components, e.g., one or more processors, memory, other port controllers, etc. The port controller 210 includes logic 212, comparators 214 and 216, and switch (SW2) 202. The comparators 214, 216, and the logic 212 may include hardware (e.g., operational amplifiers, circuitry, etc.), and/or software, and/or firmware. The comparators 214 and 216 may be used to determine a connection status of the system 200, e.g., whether one or more other port controllers intends to couple a respective power source to a system power bus 250, or has coupled the respective power source to the system power bus 250. In an embodiment, each comparator may provide a bit of information (e.g. bit A and bit B), to the logic 212. The logic 212 may determine whether to open or close switches 202 and 242, based on values of bit A and bit B.

$V_{ref\,1}$ and $V_{ref\,2}$ are reference voltages that in an embodiment may be set to $V_{ref\,1} < (I_{bias} * R_p)$ and $(I_{bias} \times R_p) < V_{ref\,2} < 2 \times (I_{bias} \times R_p)$.

In operation, the port controller may receive voltage $V_{cc}$ 280 from input power source 246. Switch 202 is initially open. The logic 210 may compare a summed voltage $V_s$ to each of reference voltages $V_{ref\,1}$ and $V_{ref\,2}$. $V_s$ (e.g., across $R_p$ 230) may result from a sum of currents including currents 260 from other port controllers (not shown). If the comparator 216 determines that $V_s$ is greater than $V_{ref\,1}$, the comparator 216 may set bit B equal to 1. Otherwise, the comparator 216 may set bit B equal to 0. Additionally, if $V_s$ is determined to be greater than $V_{ref\,2}$, comparator 214 may set bit A equal to 1. Otherwise, the comparator 214 may set bit A equal to 0. (In other embodiments, bits A and B may be set according to different criteria. For example, in another embodiment, if $V_s$ is greater than $V_{ref\,1}$, the comparator 216 may set bit B equal to 0, and if $V_s$ is determined to be greater than $V_{ref\,2}$, comparator 214 may set bit A equal to 0. Other embodiments may feature another set of criteria by which to set bits A and B.)

If B=1 the logic 212 may conclude that another controller has already powered the system power bus 250 (or is in the process of coupling an input power source to the system power bus 250) and switch 202 is left open. If B=0, the logic 212 may conclude that no other port controller intends to couple another input power source to the system power and that the system power bus 250 is not currently coupled to an input power source, and the logic 212 may close switch 202 that causes a bias current $I_{bias}$ 218, resulting from $V_{bias}$ 217, to flow through summing resistor 230. The logic 212 then waits for a delay period to expire. After the delay period has expired, if bit A=0 and bit B=1, the logic 212 may conclude that no other port controller has coupled, or is intending to couple, another input power source to the system power bus, and the logic 212 may close switch 242 to couple input power 246, received via the USB connector 248, to the system power bus 250. The delay period may ensure that if two or more controllers (e.g., controller 212 and another controller associated with another USB port that controls coupling of power source to the system power bus 250) have closed respective switches that connect respective bias currents $(I_{bias})$ to $R_p$ 230, the value of $V_s$ will reflect that both controllers are concurrently attempting to supply power from different power sources to the system power bus 250, and the logic 212 will refrain from coupling the input power source 246 to the system power bus 250.

If, after the delay period bit A=1 and bit B=1, the logic 212 may determine that another controller is attempting to connect its corresponding input power source to the system power bus 250, and connection of the input power 246 to the system power bus 250 via switch 242 is aborted. Switch 202 will again be opened and the comparator 216 may determine whether B=0. If B=1, then power is being provided (or will be provided) by another power source (not shown) via another USB port (e.g. USB port 270) as a result of another port comparator. If B=0, the logic 212 may again close switch 202, wait the delay period to expire, and logic 212 may determine whether to power the system power bus 250 based on whether bit A=0 or bit A=1. If A=0, the logic 212 determine to close switch 242 to couple the input power 246 input through the USB port 248, to the system power bus 250.

Thus, the controller 212 may determine whether to couple a power source to a system power bus via comparison of summed voltages (e.g., across a summing resistor) to each of reference voltages $V_{ref\,1}$ and $V_{ref\,2}$, and determination as to whether a conflict exists may be accomplished without an additional external microcontroller (EC).

In the event that a microcontroller (EC) is available to monitor the power provided to the system power bus 250 after the switch 242 is engaged by the logic 212, in an embodiment once the system is powered, the EC can take control of the system, and switch 202 can be opened. Opening of switch 202 can reduce overall power consumption of the apparatus 200. (For example, the EC may have been initially unable to monitor power to the system power bus, e.g., due to a dead battery condition of the system.)

Figure 3:
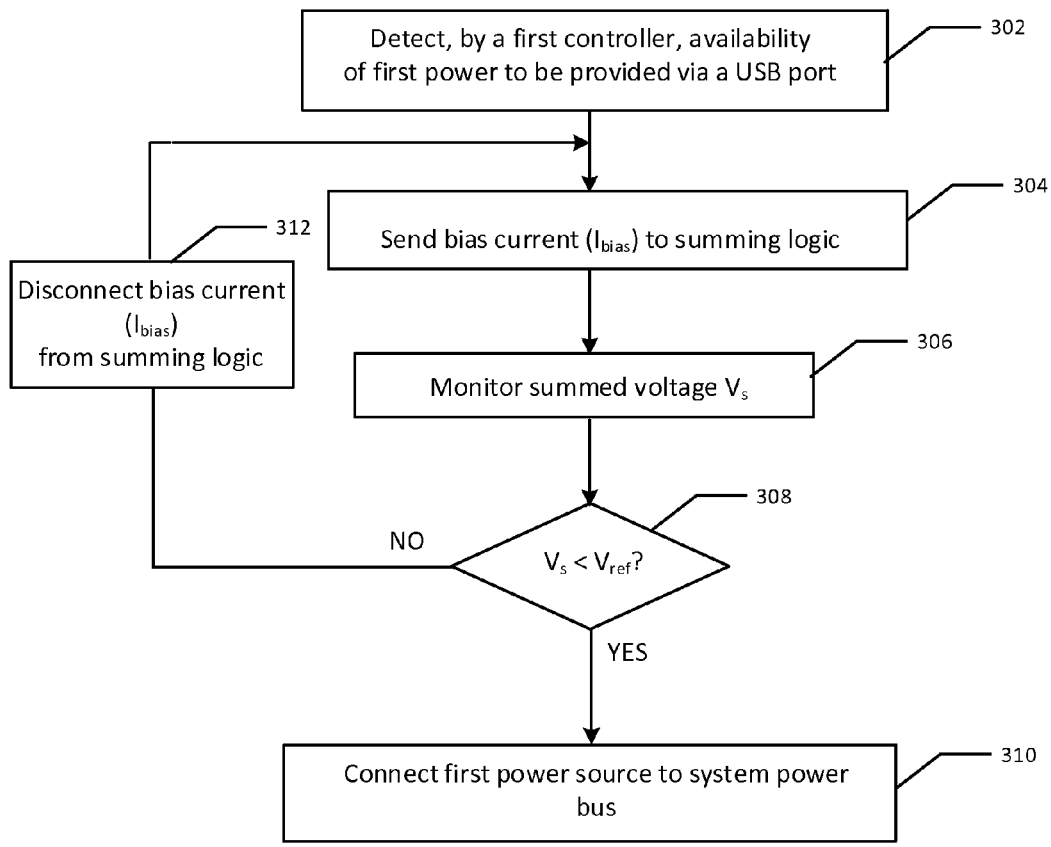
FIG. 3 is a flow diagram of a method, according to an embodiment of the present invention.

FIG. 3 is a flow diagram of a method 300, according to an embodiment of the present invention. At block 302, a first controller detects that first power is available at a first USB port (e.g., USB type C or another USB port). Continuing to block 304, a bias current $I_{bias}$ is sent by the first controller to a voltage summing logic (e.g., summing resistor). The $I_{bias}$ may indicate that the first controller intends to couple the first power to a system power bus of the system.

Advancing to block 306, the first controller monitors a summed voltage $V_s$ provided by the voltage summing logic (e.g., voltage across summing resistor). Proceeding to decision diamond 308, $V_s$ is compared with a reference value $V_{ref}$. Comparison of the summed voltage $V_s$ to $V_{ref}$ may indicate whether a second controller intends to couple second power to the system power bus, or may indicate that only the first controller intends to couple first power to the system power bus. For example, in one embodiment, if $V_s$ is less than $V_{ref}$ then the first controller may determine that no other controller intends to couple power to the system power and proceeding to block 310, the first controller may cause the first power to be provided to the system power bus by coupling the first power source to the system power bus.

If, at decision diamond 308 it is determined that $V_s$ is greater than or equal to $V_{ref}$, the first controller may conclude that at least one other controller intends to connect another power source to the system power bus, or has already connected the other power source to the system power bus. Each of the controllers that monitor $V_s$ from the summing logic may conclude that one or more other controllers intend to connect a different power source to the system power bus. Advancing to block 312, the first controller disconnects the bias current to the summing logic, at block 304 the first controller reconnects the bias current, and at block 306, the first controller monitors $V_s$. Continuing to decision diamond 308 if it is determined that $V_s$ drops to a value less than $V_{ref}$, the first controller may conclude that other controller(s) are refraining from connecting another power source to the system power bus, and advancing to block 310 the first controller may connect the first power source to the system power bus to provide first power to the system.

Figure 4:
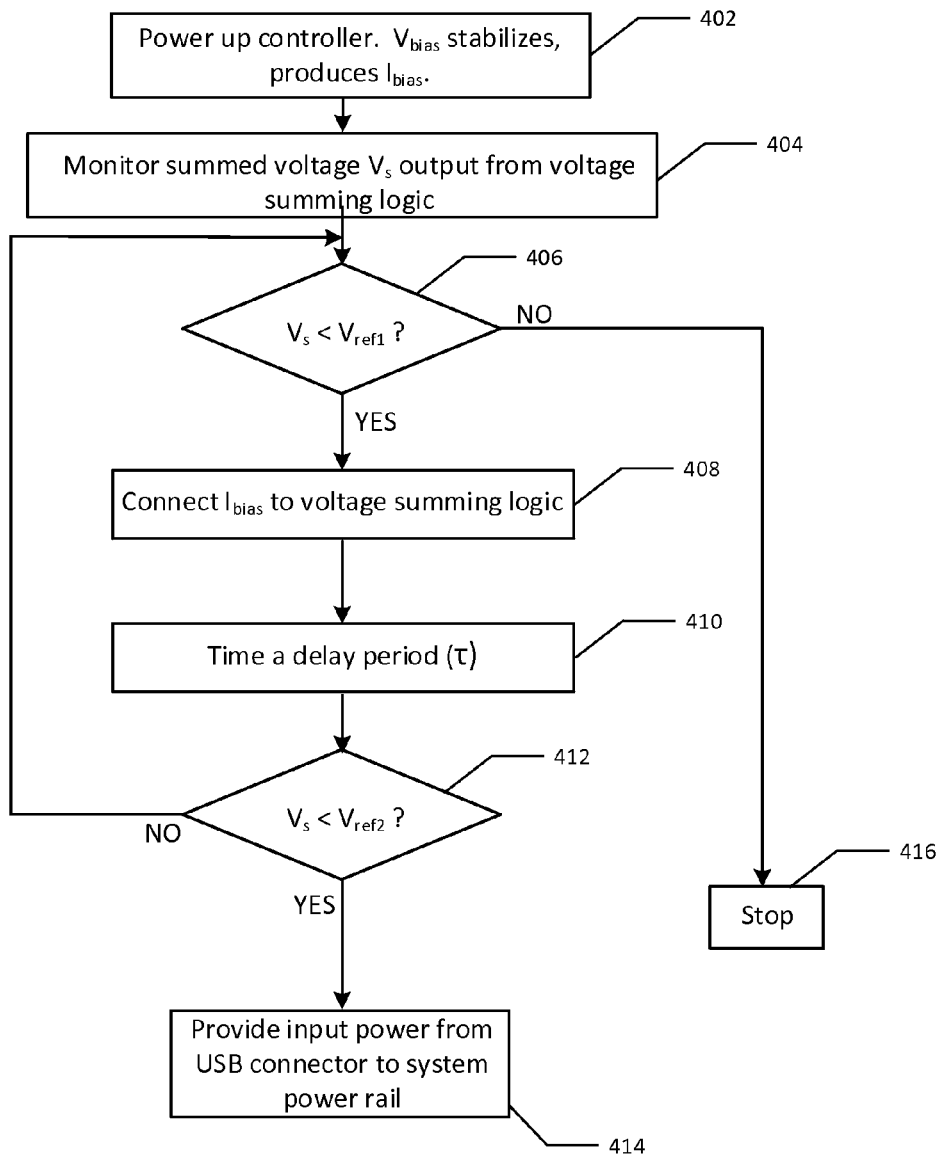
FIG. 4 is a flow diagram of a method, according to another embodiment of the present invention.

FIG. 4 is a flow diagram of a method 400, according to another embodiment of the present invention. At block 402, a port controller is powered up, e.g., via a power source from which power is received by a device that includes the port controller. The power may be received, e.g., through a USB port of the device. The port controller produces a bias voltage $V_{bias}$ that creates a sourced bias current $I_{bias}$. After powering up the port controller, $V_{bias}$ stabilizes.

Advancing to block 404, the port controller is to monitor a summed voltage $V_s$ provided by summing logic (e.g., a summing resistor). The summing logic may receive current contributions $I_{bias}$ from each of one or more port controllers. $V_s$ may provide an indication of whether another port controller is supplying power to a system power bus.

Moving to decision diamond 406, if $V_s$ is greater than a first reference voltage $V_{ref\,1}$, the port controller concludes that another port controller has coupled (or intends to couple) power from another port to the system power bus. Proceeding to block 416, the method stops, as the port controller will not provide power to the system power bus when the power is already being provided to the system power bus.

If, at decision diamond 406, $V_s$ is less than $V_{ref\,1}$, the port controller concludes that no power is being provided to the system power bus. Continuing to block 408, the port controller provides $I_{bias}$ from the port controller to the voltage summing logic, as an indication that the port controller intends to provide power to the system power bus. Advancing to block 410, the port controller times a delay time period ($\tau$). The delay period $\tau$ is intended to ensure that if another port controller decides to provide power to the system power bus, $V_s$ will reflect the intentions of two port controllers to deliver power concurrently, e.g., $V_s$ will have a value reflects is a sum of contributions from each port controller. The time delay $\tau$ allows contributory bias currents to stabilize, so as to stabilize the value of $V_s$.

Moving to decision diamond 412 (e.g., upon expiration of the delay period $\tau$) if $V_s$ is smaller than a second reference voltage $V_{ref\,2}$, the port controller is to apply the input power that it controls to the system power bus. If $V_s$ is larger than $V_{ref\,2}$ the controller may conclude that the voltage summing logic has received contributions from two (or more) port controllers, the method returns to decision diamond 406, and if $V_s$ is greater than or equal to $V_{ref\,1}$, advancing to 416 the method stops, as power is already being supplied to the system power bus.

Other embodiments are described below.

A first embodiment is an apparatus that includes voltage summation logic to provide a summed voltage corresponding to a sum of voltage contributions, each voltage contribution associated with a corresponding port controller of a plurality of port controllers. The apparatus also includes a first port controller to determine, based on the summed voltage, whether a second power source is to be coupled to a system power bus of a system via a second port controller of the plurality of port controllers, and if not, the first port controller is to couple a first power source to the system power bus.

A $2^{nd}$ embodiment includes elements of the $1^{st}$ embodiment, where the apparatus includes a universal serial bus (USB) port and where responsive to coupling the first power source to the system power bus, the system power bus is to receive power from the first power source via the USB port.

A $3^{rd}$ embodiment includes elements of the $2^{nd}$ embodiment. Further, the first port controller is to receive first port controller power from the first power source responsive to the first power source being coupled to the USB port.

A 4 embodiment includes elements of the $1^{st}$ embodiment, where the voltage summation logic includes a resistor having a first resistor terminal coupled to ground and a second resistor terminal coupled to each of the at least two port controllers, and wherein the summed voltage is to be measured between the first resistor terminal and the second resistor terminal.

A $5^{th}$ embodiment includes elements of the $1^{st}$ embodiment, and further includes a first power switch. Additionally, the first port controller is to actuate the first power switch to couple the first power source to the system power bus responsive to an outcome of a comparison of the summed voltage to a reference voltage.

A $6^{th}$ embodiment includes elements of the $1^{st}$ embodiment. Additionally, the first port controller is to include a first current source that is to provide to the voltage summation logic a first current that corresponds to a first voltage contribution associated with the first port controller.

A $7^{th}$ embodiment includes elements of the $1^{st}$ embodiment. Additionally, the first port controller includes first comparator logic to perform a comparison of the summed voltage to a first reference voltage, and wherein the first port controller is to determine whether power is being provided to the system power bus based on an outcome of the comparison.

An 8th embodiment includes elements of the 1st embodiment, and further includes the second port controller associated with a second voltage contribution to the voltage summation logic. The second voltage contribution is to be provided to the voltage summation logic responsive to a determination by the second port controller to couple a second power source to the system power bus.

A 9th embodiment includes elements of the 8th embodiment, where responsive to the second voltage contribution provided to the voltage summation logic, the second voltage contribution having a non-zero value, the first port controller is to refrain from coupling the first power source to the system power bus.

A 10th embodiment includes elements of the 8th embodiment, where the first port controller includes second comparator logic to compare the summed voltage to a second reference voltage and to output a second comparison value, and where decision logic of the first port controller is to receive the second comparison value and to determine, based at least in part on the first comparison value and the second comparison value, whether to couple the first power source to the system power bus.

An 11th embodiment includes elements of any one of embodiments 1-10. Additionally, the first port controller includes a summation voltage pin to couple to the voltage summation logic, wherein the summed voltage is to be read by the first port controller via the summation voltage pin.

A 12th embodiment is a method that includes measuring, by a first controller, a summed voltage that includes a sum of voltage contributions, each voltage contribution associated with a corresponding controller, and determining, by the first controller logic based on the summed voltage, whether to provide first power to a system power bus of a system.

A 13th embodiment includes elements of the 12th embodiment, and further includes setting a first voltage contribution associated with the first controller to a non-zero value responsive to detection of the first power source at a universal serial bus (USB) port.

A 14th embodiment includes elements of the 12th embodiment, and further includes refraining from providing the first power to the system power bus when the summed voltage has a steady-state value that is at least as great as a first reference voltage.

A 15th embodiment includes elements of the 12th embodiment, further including providing the first power to the system power bus responsive to the summed voltage having a steady-state value that is less than a first reference voltage.

A 16th embodiment includes elements of the 14th embodiment, further including responsive to the summed voltage being at least as great as the first reference voltage, repeating measuring the summed voltage and determining whether to couple the first power to the system power bus further based on a comparison of the summed voltage to a second reference voltage that is smaller than the first reference voltage.

A 17th embodiment includes elements of the 12th embodiment, further including responsive to a determination by the first controller logic to provide the first power to the system power bus, activating a switch to couple a first power source that provides the first power, via the USB port, to the system power bus.

An 18th embodiment is an apparatus to perform the method of any one of embodiments 12-17.

A 19th embodiment is an apparatus that includes means for performing the method of any one of embodiments 12-17.

A 20th embodiment is a machine-readable medium having stored thereon instructions, which if executed by a machine, cause the machine to measure a summed voltage that is based on a sum of respective voltage contributions received from each of a plurality of controller logics, and determine, based on the summed voltage, whether to provide first power to a system power bus of a system.

A 21st embodiment includes elements of the 20th embodiment, where the instructions to determine whether to provide the first power to the system power bus further includes instructions to compare the summed voltage to a first reference voltage and to couple the first power to the system power bus responsive to the summed voltage being less than the first reference voltage.

A 22nd embodiment includes elements of the 20th embodiment. Additionally, each voltage contribution is associated with a corresponding current received from a respective controller and each current is to indicate whether the respective controller has determined to couple a respective power source to the system power bus via a corresponding USB port, where each USB port is distinct.

A 23rd embodiment is an apparatus that includes means for measuring, by a first controller, a summed voltage that includes a sum of voltage contributions, each voltage contribution associated with a corresponding controller, and means for determining, by the first controller logic based on the summed voltage, whether to provide first power to a system power bus of a system.

A 24th embodiment includes elements of the 23rd embodiment, further comprising means for setting a first voltage contribution associated with the first controller to a non-zero value responsive to detection of the first power source at the USB port.

A 25th embodiment includes elements of the 23rd embodiment, and further includes means for providing the first power to the system power bus responsive to the summed voltage having a steady-state value that is less than a first reference voltage.

A 26th embodiment includes elements of the 23rd embodiment, where the means for providing the first power is further for refraining from providing the first power to the system power bus when the summed voltage has a steady-state value that is at least as great as a first reference voltage.

A 27th embodiment includes elements of the 26th embodiment, and additionally includes means for, responsive to the summed voltage being at least as great as the first reference voltage, repeating measurement of the summed voltage and for determining whether to couple the first power to the system power bus further based on a comparison of the summed voltage to a second reference voltage that is smaller than the first reference voltage.

A 28th embodiment includes elements of the 23rd embodiment, and further includes means for activating a switch to couple a first power source to provide the first power, via a USB port, to the system power bus, responsive to a determination, by the means for determining, to provide the first power to the system power bus.

A 29th embodiment is an apparatus that includes a comparator to compare a summed voltage to a reference voltage, and a summed voltage pin to provide the summed voltage to a first input of the comparator, the summed voltage received from voltage summation logic, where the comparator is to determine, based on a first comparison of the summed voltage to the reference voltage, whether to couple a first power source to a system power bus, and where the first power source is to provide power to the comparator prior to coupling the first power source to the system power bus.

A 30th embodiment includes elements of the 29th embodiment, and further includes a universal series bus (USB) port, where the power is received by the apparatus from the first power source via the USB port.

A 31st embodiment includes elements of the 29th embodiment, further includes a current source to provide a bias current to the voltage measurement logic, where the bias current corresponds to a first voltage to be included in the summed voltage and the first voltage is associated with an intent by the comparator to couple the first power source to the system power bus.

A 32nd embodiment includes elements of the 31st embodiment, where when the comparison indicates that that the summed voltage is greater than the first voltage, the comparator is to determine to refrain from coupling the first power source to the system power bus.

A 33rd embodiment includes elements of the 31st embodiment, where when the comparison indicates that the summed voltage is greater than the first voltage, the comparator is to decouple the bias current from the voltage summation logic, and to re-couple the bias current to the voltage summation logic and after re-coupling, to determine based on a second comparison of the summed voltage to the reference voltage, whether to couple the first power source to the system power bus, and responsive to the summed voltage being greater than the first voltage, to refrain from coupling the first power source to the system power bus.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
voltage summation logic to provide a summed voltage corresponding to a sum of voltage contributions, each voltage contribution associated with a corresponding port controller of a plurality of port controllers; and
a first port controller to determine, based on the summed voltage, whether a second power source to provide power to a system power bus of a system is to be coupled to the system power bus via a second port controller of the plurality of port controllers, and if not, the first port controller is to couple a first power source to provide power to the system power bus, wherein the first port controller comprises a first current source to provide to the voltage summation logic a first current to indicate that the first port controller is to couple the first power source to the system power bus, the first current corresponding to a first voltage contribution associated with the first port controller.

2. The apparatus of claim 1, wherein the apparatus includes a universal serial bus (USB) port and wherein responsive to coupling the first power source to the system power bus, the system power bus is to receive power from the first power source via the USB port.

3. The apparatus of claim 2, wherein the first port controller is to receive first port controller power from the first power source responsive to the first power source being coupled to the USB port.

4. The apparatus of claim 1, wherein the voltage summation logic includes a resistor having a first resistor terminal coupled to ground and a second resistor terminal coupled to each of the at least two port controllers, and wherein the summed voltage is to be measured between the first resistor terminal and the second resistor terminal.

5. The apparatus of claim 1, further comprising a first power switch, wherein the first port controller is to actuate the first power switch to couple the first power source to the system power bus responsive to a result of a comparison of the summed voltage to a reference voltage.

6. The apparatus of claim 1, wherein the first port controller includes first comparator logic to perform a comparison of the summed voltage to a first reference voltage, and wherein the first port controller is to determine whether power is being provided to the system power bus based on an outcome of the comparison.

7. The apparatus of claim 1, further comprising the second port controller associated with a second voltage contribution to the voltage summation logic, wherein the second voltage contribution is to be provided to the voltage summation logic responsive to a determination by the second port controller to couple a second power source to the system power bus.

8. The apparatus of claim 7, wherein responsive to the second voltage contribution provided to the voltage summation logic, the second voltage contribution having a non-zero value, the first port controller is to refrain from coupling the first power source to the system power bus.

9. The apparatus of claim 7, wherein the first port controller includes second comparator logic to compare the summed voltage to a second reference voltage and to output a second comparison value, and wherein decision logic of the first port controller is to receive the second comparison value and to determine, based at least in part on the first comparison value and the second comparison value, whether to couple the first power source to the system power bus.

10. The apparatus of claim 1, wherein the first port controller includes a summation voltage pin to couple to the voltage summation logic, wherein the summed voltage is to be read by the first port controller via the summation voltage pin.

11. A method comprising:
measuring, by a first controller to control connection of a corresponding power source to a system power bus of a system, a summed voltage that includes a sum of voltage contributions, each voltage contribution associated with a corresponding controller to indicate an intention of the corresponding controller to control connection of a corresponding power source to the system power bus, wherein the corresponding controller comprises a first current source to provide to the first controller a first current to indicate that the corresponding controller is to couple the corresponding power source to the system power bus, the first current corresponding to the voltage contribution associated with the corresponding controller; and
determining, by the first controller based on the summed voltage, whether to provide first power from the corresponding power source to the system power bus.

12. The method of claim 11, further comprising setting a first voltage contribution associated with the first controller to a non-zero value responsive to detection of the corresponding power source at a universal serial bus (USB) port.

13. The method of claim 11, further comprising refraining from providing the first power to the system power bus when the summed voltage has a steady-state value that is at least as great as a first reference voltage, the summed voltage providing an indication that second power is to be provided to the system power bus.

14. The method of claim 11, further comprising providing the first power to the system power bus responsive to the summed voltage having a steady-state value that is less than a first reference voltage.

15. The method of claim 13, further comprising responsive to the summed voltage being at least as great as the first reference voltage, repeating measuring the summed voltage and determining whether to couple the first power to the system power bus further based on a comparison of the summed voltage to a second reference voltage that is smaller than the first reference voltage.

16. The method of claim 11, further comprising responsive to a determination by the first controller to provide the first power to the system power bus, activating a switch to couple the corresponding power source that provides the first power, via the USB port, to the system power bus.

17. A non-transitory machine-readable medium having stored thereon instructions, which if executed by a machine, cause the machine to:
measure a summed voltage that is based on a sum of respective voltage contributions received from each of a plurality of controller logics to indicate an intention of the corresponding controller logic to control connection of one of a plurality of power sources to provide power to a system power bus of a system, each of the plurality of controller logics associated with the one of the plurality of power sources to provide the power to the system power bus of the system, wherein each voltage contribution is associated with a corresponding current to be received from a respective controller logic and each current is to indicate whether the respective controller logic has determined to couple a respective power source to the system power bus; and
determine, based on the summed voltage, whether to provide first power to the system power bus.

18. The non-transitory machine-readable medium of claim 17, wherein the instructions to determine whether to provide the first power to the system power bus further include instructions to compare the summed voltage to a first reference voltage and to couple the first power to the system power bus responsive to the summed voltage being less than the first reference voltage.

19. The non-transitory machine-readable medium of claim 17, wherein the respective controller logic is to couple the respective power source to the system power bus via a corresponding USB port, wherein each USB port is distinct.

* * * * *